US010120163B2

United States Patent
Seitz et al.

(10) Patent No.: US 10,120,163 B2
(45) Date of Patent: Nov. 6, 2018

(54) AUTO-FOCUS METHOD FOR A COORDINATE-MEASURING APPARATUS

(71) Applicant: Carl Zeiss Industrielle Messtechnik GmbH, Oberkochen (DE)

(72) Inventors: Dominik Seitz, Schwäbisch Gmünd (DE); Nils Haverkamp, Aalen (DE); Christoph Kranz, Giengen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 70 days.

(21) Appl. No.: 15/442,662

(22) Filed: Feb. 25, 2017

(65) Prior Publication Data

US 2017/0248768 A1 Aug. 31, 2017

(30) Foreign Application Priority Data

Feb. 25, 2016 (DE) .................. 10 2016 202 928

(51) Int. Cl.

| G02B 7/38 | (2006.01) |
|---|---|
| G06T 7/571 | (2017.01) |
| G02B 7/28 | (2006.01) |
| G06T 7/00 | (2017.01) |
| H04N 5/225 | (2006.01) |
| H04N 5/232 | (2006.01) |

(52) U.S. Cl.
CPC .............. *G02B 7/38* (2013.01); *G02B 7/282* (2013.01); *G06T 7/0004* (2013.01); *G06T 7/571* (2017.01); *H04N 5/2256* (2013.01); *H04N 5/23212* (2013.01); *G06T 2207/10016* (2013.01); *G06T 2207/10148* (2013.01); *G06T 2207/30164* (2013.01)

(58) Field of Classification Search
CPC ..................... G02B 7/282; G02B 7/38; G06T 2207/10148; G06T 2207/30164; G06T 7/0004; G06T 7/571; H04N 5/2256; H04N 5/23212
See application file for complete search history.

(56) References Cited

U.S. PATENT DOCUMENTS

| 2004/0131244 | A1 | 7/2004 | Nehse et al. |
|---|---|---|---|
| 2014/0043470 | A1 | 2/2014 | Winterot et al. |
| 2015/0015696 | A1 | 1/2015 | Delaney |
| 2016/0193681 | A1* | 7/2016 | Pesme ................. B23K 9/0956 219/130.01 |
| 2017/0045350 | A1 | 2/2017 | Fiekers |

(Continued)

OTHER PUBLICATIONS

M. Subbarao et al., "Focusing techniques," Optical Engineering, vol. 32, No. 11, pp. 2824-2836, 1993.

(Continued)

*Primary Examiner* — Behrooz Senfi
(74) *Attorney, Agent, or Firm* — Ewers & Hasselmann PLLC (57) ABSTRACT

A method is disclosed for ascertaining a focus image distance of an optical sensor, which is provided with a lens, of a coordinate-measuring apparatus onto a workpiece to be measured, wherein the optical sensor and/or the workpiece are movable in a Z direction such that a distance in the Z direction between the workpiece and the optical sensor is variable. Further, a corresponding coordinate-measuring apparatus and a computer program product are disclosed.

21 Claims, 4 Drawing Sheets (56) References Cited

U.S. PATENT DOCUMENTS

2017/0143442 A1\* 5/2017 Tesar .................. A61B 90/37
2017/0169559 A1\* 6/2017 Tsai ................... G06T 7/0004

OTHER PUBLICATIONS

Zhang et al., "Fast and accurate auto-focusing algorithm based on the combination of depth from focus and improved depth from defocus ," Optics Express, vol. 22, No. 25, pp. 31237-31247, 2014.

\* cited by examiner

AUTO-FOCUS METHOD FOR A COORDINATE-MEASURING APPARATUS

CROSS REFERENCE TO RELATED APPLICATIONS

This application is claiming priority from German application 10 2016 202 928.2, filed Feb. 25, 2016, and the entire content of the application is incorporated herein by reference.

TECHNICAL FIELD

The present invention relates to a method for ascertaining a focused image distance of an optical sensor of a coordinate-measuring machine onto a workpiece to be measured, wherein the optical sensor and/or the workpiece are movable in a Z direction such that a distance in the Z direction between the workpiece and the optical sensor is variable.

The present invention furthermore relates to a coordinate-measuring machine having an optical sensor and a control device for focusing the optical sensor.

BACKGROUND

Coordinate-measuring machines are generally known in the art. They serve for checking workpieces, for example as part of quality assurance, or for ascertaining the geometry of a workpiece completely as part of what is known as "reverse engineering". Moreover, multifarious further application possibilities are conceivable.

In coordinate-measuring machines of this type, different types of sensors can be used to capture the coordinates of a workpiece to be measured. By way of example, sensors that measure in tactile fashion are known in this respect, as are sold for example by the applicant under the name "VAST XT" or "VAST XXT". Here, the surface of the workpiece to be measured is probed with a stylus, with the coordinates of the stylus within the measurement space being known at all times. Such a stylus can also be moved along the surface of a workpiece, with the result that a multiplicity of measurement points can be captured at fixed time intervals during such a measurement operation as part of what is known as a "scanning method".

It is furthermore known to use optical sensors that permit contactless capturing of the coordinates of a workpiece. One example of such an optical sensor is the optical sensor sold by the applicant under the name "ViScan".

The sensors can then be used in different types of measurement constructions. One example of such a measurement construction is the product "0-INSPECT" by the applicant. In a device of this type, both an optical sensor and a tactile sensor are used to perform various examination tasks on a machine and ideally with a single setup of a workpiece to be measured. In this way, it is possible to simply perform all the examination tasks for example in medical technology, plastics technology, electronics and precision engineering. Various other constructions are, of course, also conceivable.

In one device, such as for example the "0-INSPECT", the measured workpiece is set up on a table. The table here forms an XY plane. The optical sensor is spaced apart from the workpiece to be measured perpendicularly from this plane, i.e. in the Z direction of a Cartesian coordinate system. The optical sensor should be focused onto the workpiece to be measured in dependence on the workpiece to be measured and the relative position of the optical sensor and the table with respect to one another. What applies generally here for all XY positions of the table is focusing in the Z direction.

Focusing is performed automatically by the coordinate-measuring machine. As is known, this is done by a user first manually moving the optical sensor to a position or a distance from the workpiece to be measured where he expects approximately a maximum sharpness or focus on the workpiece. He will then specify a search region in the form of a length specification or a separation in the Z direction within which the search for the maximum sharpness or best focus is to be carried out.

The camera is then moved further away from the workpiece to be measured by half of the specified search region and then moves very slowly to the end of the search region toward the workpiece. During this camera movement, images of this workpiece are captured using the optical sensor at specific time intervals and retrieved from the optical sensor by the coordinate-measuring machine. During an evaluation, what is known as a contrast value of a specific region of the retrieved image is then ascertained as a contrast criterion, and the position or the distance from the workpiece to be measured, in which the image request was sent, is stored together with the contrast value. The multiplicity of contrast values thus ascertained and the respectively associated distances from the workpiece to be measured can be used to plot what is known as a contrast value curve. The coordinate-measuring machine is then able to determine an extreme value of this curve. The distance that is associated with that extreme value then represents the distance where the maximum sharpness or the best focus of the optical sensor occurs, and the optical sensor is set to this distance from the workpiece to be measured.

A multiplicity of methods is known within the art that can determine a contrast value. For example, a region of the images can be chosen for the evaluation within which an edge of a workpiece to be measured is located. A very abrupt colour transition or bright-dark transition is then located in this region. A contrast value can then be, for example, the maximum gradient of the greyscale levels of the image perpendicular to the edge. The sharper an image is set, the greater the gradient, since ideally an abrupt transition from bright to dark occurs from one pixel to the next. The less sharp the image is set, the more continuous is the bright-dark transition and the lower is the gradient. Of course, many further possibilities for determining a contrast value are also conceivable and known.

Document US 2014/043470 describes a coordinate-measuring machine having a workpiece holder for holding a measurement object, and a measurement head that is movable relative to the workpiece holder. The measurement head carries an optical sensor. An evaluation and control unit is configured to determine spatial coordinates on the measurement object in dependence on a position of the measurement head relative to the workpiece holder and in dependence on sensor data of the optical sensor. The optical sensor includes a lens and a camera. The lens has a stop and at least four separate lens element groups, three of which are individually displaceable along the optical axis of the lens. The stop is furthermore also individually displaceable along the optical axis. A first lens element group is arranged fixedly in the region of the light-entry opening of the lens. A coordinate-measuring machine having such a lens permits the variation of magnification, focusing, resolution and other parameters across a wide range of application.

Such sensors are distinguished in particular by being able to operate at many different working distances between the optical sensor and the workpiece. Moreover, they are able to operate with different, arbitrarily selected magnifications. Among other things, this also permits without problems measurement of workpieces having relatively large height differences. At the same time, it has the consequence that the space region in which a plane of best focus can be located becomes relatively large in principle. It is more difficult for a user to estimate in advance whereabouts the plane of best focus will be located. As a result, it becomes necessary to initially set a relatively large "catchment region" to ensure that the plane of best focus is located within this catchment region. The catchment region here refers to the region across which a search for the plane of best focus is started.

However, a relatively large catchment region has so far been associated with two disadvantages. One, it takes a relatively long time until a plane of best focus is found by way of contrast criteria, since a relatively large distance needs to be travelled. Second, the reproducibility of the result for the plane of best focus decreases. This could be countered by increasing the number of recordings within the catchment region and/or reducing the speed at which the catchment region is travelled. However, this results in a further increase of the time needed for the auto-focusing. Consequently, it is either possible to achieve only very slow auto-focusing, or it is necessary to limit a maximum size of the catchment region, but this is undesired and carries the risk that the plane of best focus is located outside the actual catchment region.

In particular in lenses having a large numerical aperture and correspondingly having a large opening angle, the depth of field of the lens is reduced, as a result of which any meaningful initial catchment region is delimited since evaluable recordings are no longer obtained outside the depth of field region.

SUMMARY

Against this background, it is a technical object of the present invention to provide a method for ascertaining a focused image distance of an optical sensor of a coordinate-measuring machine and a coordinate-measuring machine, in which the ascertainment of the focused image distance is performed as quickly as possible even with initial starting values outside the depth of field region of the lens.

According to a first aspect of the invention, a proposal is therefore made to develop the method mentioned in the introductory part further by way of at least one of the following steps:

a) a determination step in which the intensity of a first image of the surface of the workpiece to be measured that was recorded with the optical sensor is assessed at a first set focal distance, and the intensity of a second image of the surface of the workpiece to be measured that was recorded with the optical sensor is assessed at a second set focal distance in order to determine therefrom the most probable location of the best focus in relation to the first set focal distance and to the second set focal distance;

b) an approximation step in which at least three different focal distances are set in the proximity of the most probable location of the best focus, and the location of the best focus is determined approximately on the basis of the intensities of the images that are recorded in the process.

The relative movement between the optical sensor and the variation in distance can here take place by way of holding the optical sensor in place and moving a table on which the workpiece is arranged in the Z direction. The Z direction is here perpendicular to the table or to the workpiece. A separation between the optical sensor and the workpiece in the Z direction thus represents the distance between the optical sensor and the workpiece.

However, provision may also be made for the table or the workpiece to be fixed and the optical sensor to move. Provision may ultimately also be made of course for both the optical sensor and the workpiece to be moved. What is important is to vary the distance, i.e. the separation between the optical sensor and the workpiece in the Z direction.

It has been found that even though contrast values can no longer be evaluated during an image recording for an initial focal distance which is greater than the current depth of field of the lens, a different criterion can be evaluated, specifically the intensity of the image recording. Using the intensity as a criterion, it is possible to ascertain the location of the best focus just as on the basis of contrast criteria. The image in the best focus has the highest intensity, and the profile of the intensity curve plotted over the focal distance corresponds to that of a Gauss curve. However, what is decisive with respect to the contrast value curves is that the intensity curve extends far over the depth of field region of the lens, whereas the contrast value curves take up only a fraction of the depth of field region. It is thus possible in the course of the determination step to specify, by way of the ascertainment of only two intensity values of two image recordings, the direction and the distance, with respect to the two set focal distances, in which a search for the most probable location of the best focus is to be effected. The intensity of a recorded image is here understood to mean the total intensity of the image as a sum over all intensities of the individual pixels.

Likewise, according to an aspect of the invention, the location of the best focus is approximately determined in an approximation step on the basis of the intensities of images that are recorded at three different focal distances. It is possible based on three support locations to approximately determine the location of the extreme value of an intensity Gauss curve well.

In the case that the probable location of the best focus is already sufficiently known at the start of the measurement with respect to the workpiece surface, the determination step can be dispensed with, and the method can start immediately with the approximation step.

It is thus possible with the method according to an aspect of the invention to approximately determine very quickly the most probable location of the best focus or the location of the best focus on the basis of only two or three image recordings which can also be taken outside the depth of field region.

In one exemplary embodiment, the method includes a conventional contrast evaluation step in which the exact location of the best focus is determined based on contrast criteria. By using an additional contrast evaluation step, it is possible to determine the exact location of the best focus with far greater accuracy than by using intensity criteria alone. All customary contrast evaluation methods are suitable for this purpose, since all are based on contrast criteria which have sharply delimited curves within the depth of field region. Said delimited curves can be evaluated with respect to their extremum with far greater accuracy than the intensity Gauss curve which is distributed widely over the depth of field region.

With the proposed method, it becomes possible, starting from a catchment region of arbitrary size, to precisely determine the exact location of the best focus with constant reproducibility. In a coordinate-measuring machine, this then helps to achieve measurement results reproducibly and precisely with this setting for the plane of the sharpest image. The magnification of a lens can here be arbitrarily set and is known.

Moreover, the proposed method very quickly leads to the ascertainment of the exact location of the best focus, even in the case of catchment regions which are selected to be very large as compared to the depth of field, since many image recordings are taken only in the contrast evaluation step and since this contrast evaluation step takes place only after the location of the best focus has already been approximately determined. The method according to an aspect of the invention can thus also be used to reduce the number of the image recordings that are necessary for the contrast evaluation step.

The term "magnification" in this case refers to the usual meaning in optics, specifically the ratio between the size of the image and the true size of an object. Relevant in particular is here also the axial magnification, i.e. the magnification along the optical axis, since it influences the depth of field. Since this is, strictly speaking, defined only within the paraxial region, i.e. the optical space near the axis, the term "magnification" in general is used.

Initially, the magnitude of the depth of field which depends on the wavelength of the light is thus calculated from the set magnification and a numerical aperture of the lens, which are both known. The equations used for calculating this depth of field will be explained below in more detail. In particular, it is possible to first determine, from a known image-side numerical aperture and the magnification, the object-side numerical aperture and then, based on a reference wavelength, the depth of field.

Depth of field refers to the length the optical sensor can travel in the direction of the optical axis over which the ascertained image still gives the approximately same sharper impression.

According to a second aspect of the invention, a proposal is made for the initially mentioned coordinate-measuring machine to be developed further to the effect that the control device is set up for performing a method according to the first aspect of the invention.

According to a third aspect of the invention, a computer program product is moreover provided with a computer program which has program code means for performing a method according to the first aspect of the invention if the computer program is executed on a coordinate-measuring machine or a data processing apparatus of a coordinate-measuring machine, which in particular can also be connected as an external unit to the coordinate-measuring machine, or a control device of a coordinate-measuring machine.

The coordinate-measuring machine according to the second aspect of the invention and the computer program product according to the third aspect of the invention have the same advantages as the method according to the first aspect of the invention.

The object stated initially is therefore fully achieved.

In one exemplary embodiment, the method includes all three steps mentioned. In this embodiment, it is possible for the method to be performed fully automatically by the coordinate-measuring machine independently of the knowledge of the possible location of the best focus on the part of the operating personnel, for example.

In one further exemplary embodiment, the approximation step of the method is performed after the determination step. It is thus possible that the location of the exact focus is approximately determined with as little as five image recordings. However, the resulting error in the determination of the location of the best focus is acceptable for many metrology applications, such that a very fast focusing method can be made available for these applications herewith.

In one exemplary embodiment, the contrast evaluation step of the method is performed after the approximation step. It is thus possible for the highest accuracies for the determination of the exact location of the best focus to be achieved, since the selection of the focus zone for the contrast evaluation step is effected in the knowledge of the approximately determined location of the best focus.

In one further exemplary embodiment of the method, provision may be made for a first difference distance between the first set focal distance and the second set focal distance to be selected in the determination step in accordance with $DA_a = a*DOF$, wherein $DA_a$ is the difference distance, a is a factor, and DOF is a depth of field of the lens. It is easily possible in this manner to specify the difference distance in dependence on a depth of field of the optical sensor in the selected setting. In particular, a is greater than 1.

In one exemplary embodiment of the method, provision may be made for the factor a to lie in a range $1 < a < 5$, preferably in a range $2 < a < 4$, with further preference to be 3. With this range selection for the factor a, it is ensured that the start can be the determination step outside the depth of field region of the lens, and that it is additionally possible to select starting values for this purpose, which permit a reliable prediction to be made for the most probable location of the best focus based on the intensity.

It has been shown that roughly three times the depth of field should be selected as the difference distance $DA_a$ so as to permit the determination of the most probable location of the plane of the sharpest image.

In one further exemplary embodiment of the method, provision may be made for a second difference distance between the at least three focal distances to be selected in the approximation step in accordance with $DA_b = b*DOF$, wherein $DA_b$ is the largest possible difference distance between the at least three focal distances, b is a factor, and DOF is a depth of field of the lens. It is easily possible in this manner to specify the second difference distance in dependence on a depth of field of the optical sensor in the selected setting. In particular, b is smaller than 2.

In one exemplary embodiment of the method, provision may be made for the factor b to lie in a range $0.25 < b < 2$, preferably in a range $0.25 < b < 1.25$, with further preference to be 1. With this range selection for the factor b, it is ensured that the start can be the approximation step approximately with the depth of field region of the lens, with the result that the most probable location of the best focus does not necessarily have to be known for this purpose, and that it is additionally possible to select starting values for the factor b which permit a reliable prediction to be made for the extremum of the intensity Gauss curve.

It has been shown that the depth of field should be selected roughly as the difference distance $DA_b$ so as to permit the approximate determination of the location of the plane of the sharpest image on the basis of the prediction of the extremum of the intensity Gauss curve.

In one exemplary embodiment of the method, provision may be made for the lens to be a zoom lens which is telecentric on both sides.

Such a lens not only permits operation with different magnifications, but, owing to the two-sided telecentricity, also accurate capturing over a large region of working distances. In particular, it is possible to keep the image-side numerical aperture constant. For example, the image-side numerical aperture may be constantly at 0.032.

In one exemplary embodiment of the method, provision may be made for the depth of field of the object to be determined pursuant to $$DOF = \frac{\lambda}{(NA \cdot V)^2}$$

wherein DOF is the depth of field of the lens, V is the magnification of the lens, in particular axial magnification, NA is the image-side numerical aperture at the magnification, and $\lambda$ is a reference wavelength.

The following table gives an example of how, in an optical sensor that has a constant image-side numerical aperture of 0.032, the depth of field at a reference wavelength of 550 nm is obtained in dependence on the magnification.

| Image-side numerical aperture [—] | Magnification [—] | Object-side numerical aperture [—] | Depth of field [mm] Reference wavelength [mm] 0.00055 |
|---|---|---|---|
| 0.032 | 0.4 | 0.0128 | 3.356933594 |
| 0.032 | 0.7 | 0.0224 | 1.096141582 |
| 0.032 | 1 | 0.032 | 0.537109375 |
| 0.032 | 2 | 0064 | 0.134277344 |
| 0.032 | 2.2 | 0.0704 | 0.110973011 |
| 0.032 | 2.65 | 0.0848 | 0.076484069 |
| 0.032 | 3.2 | 0.1024 | 0.052452087 |
| 0.032 | 4 | 0.128 | 0.033569336 |
| 0.032 | 6.25 | 0.2 | 0.01375 |

The product is here formed from the image-side numerical aperture and the magnification of the object-side aperture, so that: object-side aperture=image-side numerical aperture×magnification. With a known, in particular constant, image-side numerical aperture of a specified reference wavelength, which can in particular be specified for 550 nm, it is thus possible only in dependence on the set magnification V to determine the depth of field and, from this depth of field, the first and/or the second difference distance. This permits simple and quick ascertainment of said difference distances. In particular, the depth of field and/or the difference distances can thus be directly determined systematically with stipulation of a specific magnification and be kept for further use.

In one exemplary embodiment of the method, provision may be made for the reference wavelength to lie in a range of 400 nm≤λ≤650 nm, preferably to be 550 nm.

In particular, the reference wavelength should lie within the spectral range of the light sources of the coordinate-measuring machine. A wavelength of 550 nm in principle is approximately in the centre of the spectral range that is visible to humans, in particular the spectral range between 380 nm and 780 nm, and can thus be preferred in the case of corresponding light sources. However, if monochromatic light sources are used for example, in particular laser light sources, provision may be made for the corresponding wavelength of the light sources to be used as the reference wavelength.

In one exemplary embodiment, the coordinate-measuring machine according to an aspect of the invention can be provided with an illumination system for generating a bright-field incident light illumination, wherein at least parts of the lens can also be used for the illumination system for subjecting the surface to be measured to illumination light. It is possible hereby to increase the effect of the intensity Gauss curve assuming an extremum at the site of best focus.

In one exemplary embodiment of the coordinate-measuring machine, provision may here be made for the illumination system to emit light with wavelengths in a range of 400 nm to 650 nm, and for the lens to have, for at least one of the wavelengths in said range for the illumination system for generating the bright-field incident light illumination on the surface to be measured, the same exact location of the best focus as for the imaging of the surface to be measured on the sensor. By making, for at least one wavelength, the location of the best focus for the illumination of a surface to be measured on the path of the light from the light source to the surface to be measured identical to the location of the best focus for the return path of the light from the surface to be measured to the CCD or CMOS sensor of the camera, excess raising of the extremum of the intensity Gauss curve is ensured, as a result of which this extremum and the location thereof are more easily ascertained.

It will be appreciated that the aforementioned features and those still to be explained below can be used not only in the respectively cited combination but also in other combinations or singly, without departing from the scope of the present invention.

BRIEF DESCRIPTION OF THE DRAWINGS

The invention will now be described with reference to the drawings wherein.

DESCRIPTION OF EXEMPLARY EMBODIMENTS

Figure 1:
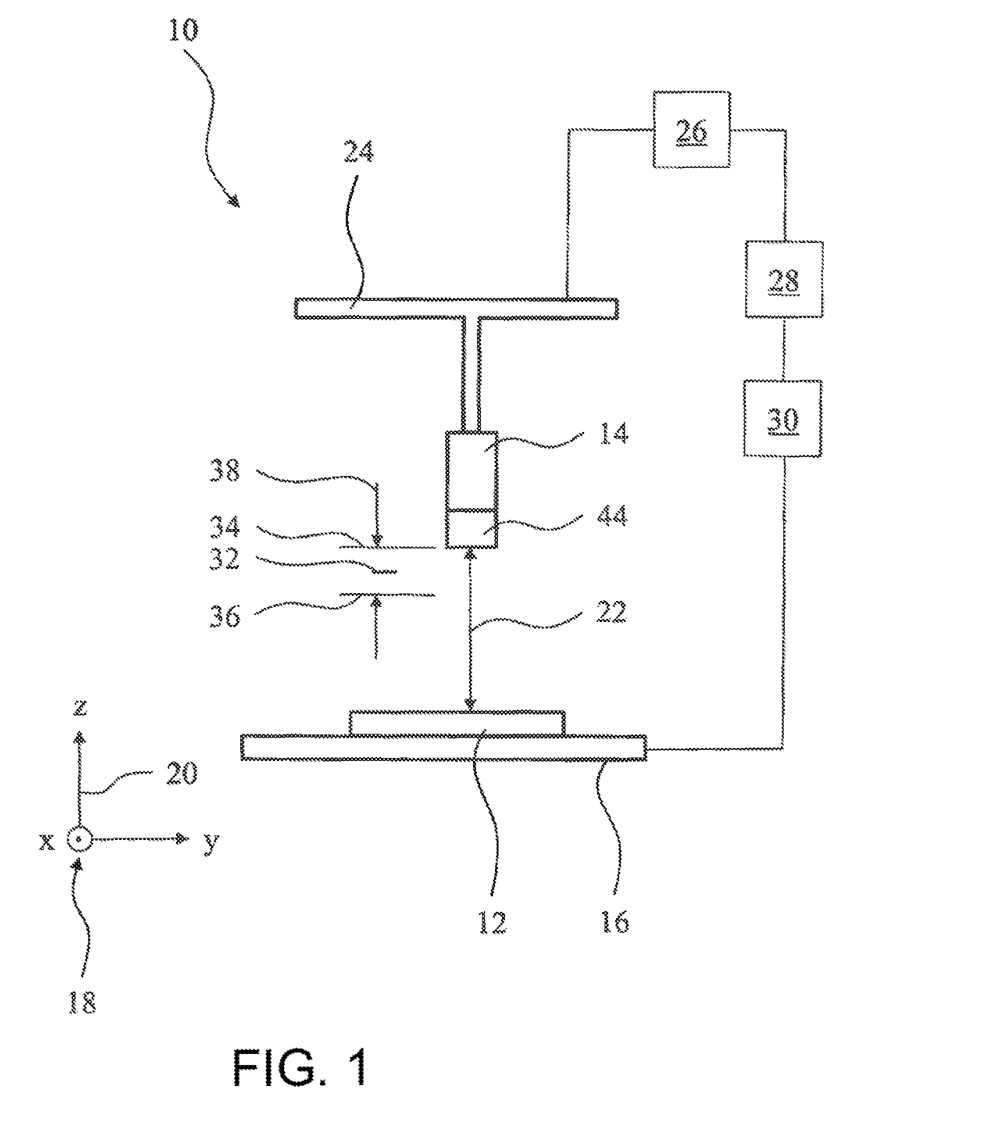
FIG. 1 shows a schematic view of an exemplary embodiment of a coordinate-measuring machine.

FIG. 1 shows a coordinate-measuring machine 10. The coordinate-measuring machine 10 serves for measuring a workpiece 12. For this purpose, the coordinate-measuring machine 10 has an optical sensor 14. In addition to the optical sensor 14, further sensors can be provided, for example tactile sensors, which are not illustrated in the present schematic depiction, however.

The workpiece 12 to be measured is arranged, for example, on a table or a base plate 16. In the illustrated view, the table or the base plate is aligned in an XY plane of a coordinate system 18. A Z direction 20 extends perpendicular to the table 16. A distance between the optical sensor 14 and the workpiece 12 in the Z direction 20 is provided with a reference sign 22. The optical sensor 14 and the table 16 or the workpiece 12 are movable relative to one another. In this way, the distance 22 can be varied. In principle, provision may be made for this purpose for either the table 16 to be movable at least in the Z direction or for the optical sensor 14 to be movable, for example by a suitable mechanism 24, in the Z direction. The mechanism 24 can also be, for example, a portal construction or the like. The coordinate-measuring machine does not necessarily have to have a table setup. Provision may also be made for both the optical sensor 14 and the table 16 to be movable in the Z direction.

For the sake of simplicity, it is assumed in the following exemplary embodiments that the table 16 or the workpiece 12 remains fixed and that the optical sensor 14 is moved in the Z direction to vary the distance 22 between the optical sensor 14 and the workpiece 12. However, this does not necessarily have to be the case.

In order to vary the distance 22 such that the optical sensor 14 is focused onto the workpiece 12, the coordinate-measuring machine 10 has a control device 26. The control device 26 is capable of moving the optical sensor 14 at a distance 22 relative to the workpiece 12 such that the images recorded by the optical sensor 14 have maximum sharpness. To this end, an auto-focus function of the coordinate-measuring machine 10 can be triggered. Furthermore, the coordinate-measuring machine 10 has a data processing device 28 which is configured to carry out a request for images of the optical sensor 14 and their evaluation and, based on these results, outputs a position of the optical sensor 14 in which focusing of the optical sensor 14 onto the workpiece 12 is set. This is then adjusted by the control device 26. The control device 26 and the data processing device 28 can also be implemented as a single unit or a single element; the data processing device 28 and the control device 26 are illustrated as separate units merely for the purposes of explanation.

Moreover, the coordinate-measuring machine 10 can have an input device 30. This can be used by a user to input into the coordinate-measuring machine 10 for example desired search regions or to manually move the optical sensor 14 and thus also to manually adjust a distance 22 between the optical sensor 14 and the workpiece 12.

At the start of a method, provision may be made for a user to adjust the optical sensor 14 approximately near an assumed focal distance 32. Starting from this assumed focused distance, a first focal distance 34 and a second focal distance 36 are specified which define between them a catchment region 38. In this exemplary embodiment, the first focal distance 34 is at a greater distance 22 from the workpiece 12 than the second focal distance 36. Of course, this can also be selected to be the other way around. Alternatively, provision may furthermore be made, if no user input is intended to be made at the beginning, for the first focal distance 34 to be specified at a maximum possible distance 22 between the optical sensor 14 and the workpiece 12 and for the second focal distance 36 to be specified at a minimum possible distance 22 between the optical sensor 14 and the workpiece 12.

Figure 2A:
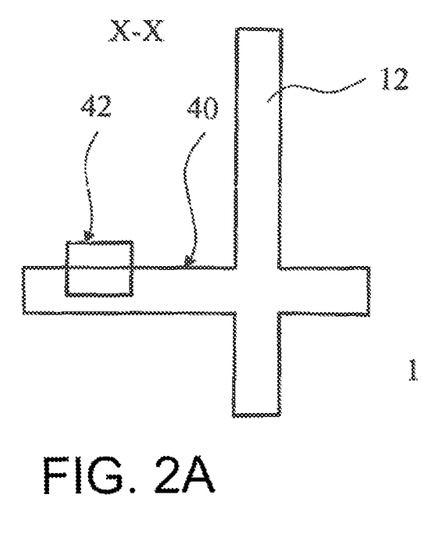
FIG. 2A shows an exemplary view of an image.

FIG. 2A shows an example of an image which is recorded by the optical sensor 14 during a focusing operation.

Figure 2B:
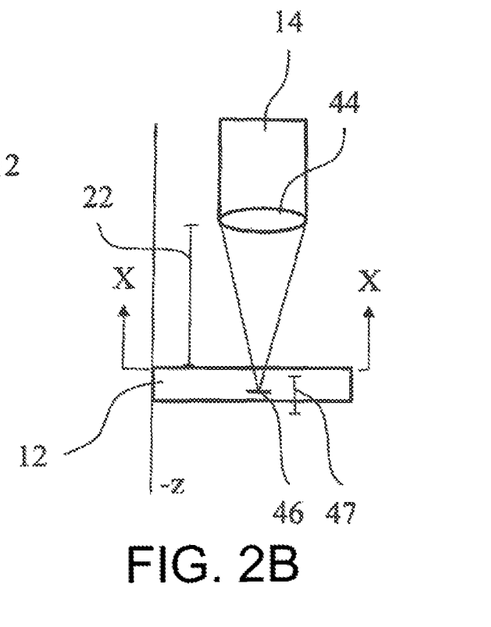
FIG. 2B shows the focusing conditions during the recording of the image in FIG. 2B.

FIG. 2B shows the recording conditions during the recording of the image illustrated in FIG. 2A.

In the illustrated exemplary embodiment, provision may be made, for example for a bright-dark transition over an edge 40 that is visible in the image distance of the workpiece 12 to be used as a contrast criterion. Accordingly, what is known as an "area of interest (AOI)" 42 in the image is specified, which has the edge 40 and is subsequently evaluated. In the illustrated example, the edge 40 extends horizontally through the image. Accordingly, for example a grey level gradient in the vertical direction, i.e. perpendicular to the edge 40, within the AOI 42 can be used to form the contrast criterion. The optical sensor 14 during the recording is set at a specific distance 22 from the workpiece 12.

Provision may be made, for example, for a surface of the workpiece 12 that faces the optical sensor 14 to be examined. The optical sensor 14 has a lens 44 which must be adapted and arranged for optimum focusing such that a tip 46 of a focus cone is arranged on the surface of the workpiece 12 to be observed. In the exemplary embodiment, the focus cone is located somewhat within the workpiece 12, i.e. the distance 22 is a little too small. A depth of field is designated 47 starting from the tip 46 of the focus cone. The image illustrated in FIG. 2A is correspondingly unsharp, i.e. a bright-dark transition over the edge 40 has a relatively flat gradient or, in the extreme case, no gradient at all. It is thus generally no longer possible to ascertain a gradient outside the depth of field. In the case of maximum sharpness, the focus cone 46 would be located on the workpiece 12. The bright-dark transition would then occur abruptly within the AOI 42, as a result of which the gradient would be correspondingly high. The evaluation of the location of the best focus is thus limited to the depth of field region 47 around the tip of the focus cone 46 on the basis of contrast criteria such as the grey level gradient.

Figure 2C:
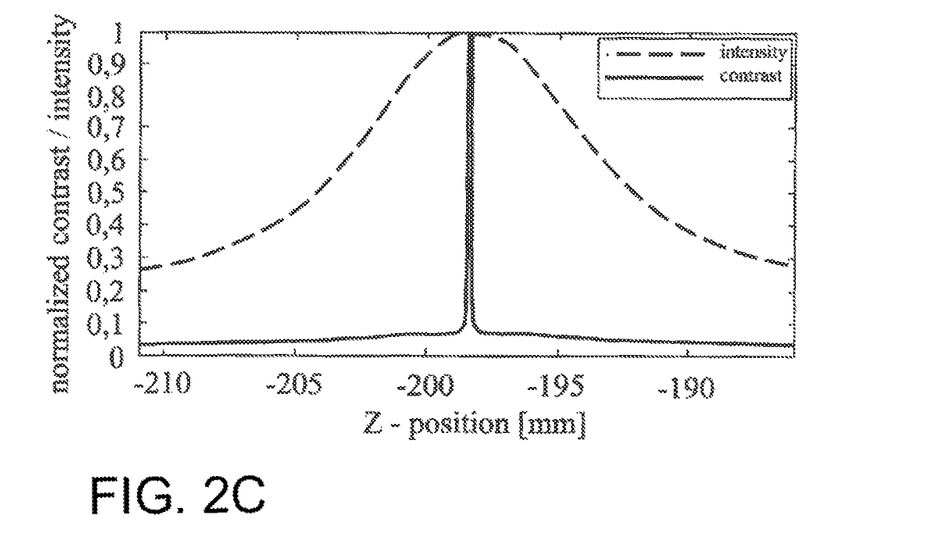
FIG. 2C shows a diagram for explaining the difference between an intensity Gauss curve and a contrast value curve.

However, in contrast to a contrast criterion such as the grey level gradient, the intensity can be evaluated as a function of the distance 22 as a focus criterion even if a sharp image can no longer be generated, as is illustrated in FIG. 2B. The overall intensity over all pixels of a recording is not dependent on whether a bright-dark transition at an edge 40 can be perceived in the recorded image. This is also made clear in FIG. 2C. Here, by way of comparison, the intensity and the grey level gradient are plotted as a contrast criterion normalized as a function of the distance 22. What can clearly be seen is that the intensity distribution of a Gauss curve and, in comparison therewith, the contrast criterion corresponds to a Dirac delta function. The delta function of the contrast criterion is here limited approximately to the depth of field region 47, whereas the intensity Gauss curve extends far beyond this region 47.

Figure 3A:
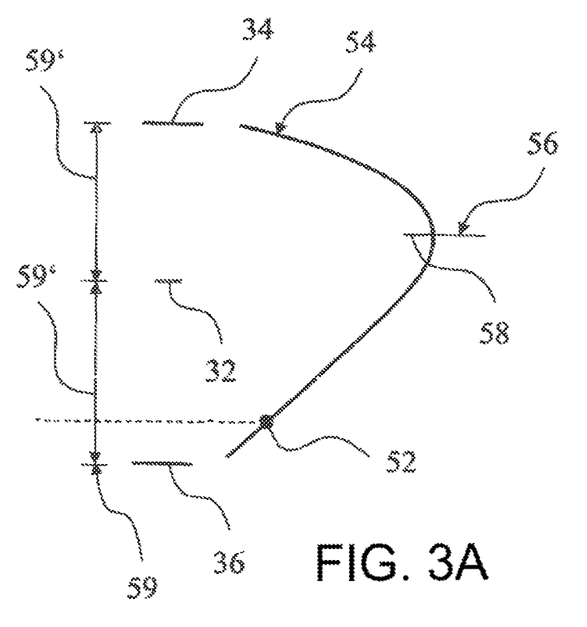
FIG. 3A shows a schematic view for explaining the determination step.

FIG. 3A schematically illustrates how the most probable location of the best focus 58 is obtained from the images, recorded in the determination step, of the first focal distance 34 and the second focal distance 36. Here, in FIG. 3A, a distance 59 or a first difference distance $DA_a$ between the first focal distance 34 and the second focal distance 36 is plotted. The distance 59 or the difference distance $DA_a$ is divided into two portions 59' of identical length. Starting from the assumed focused distance 32, which is initially set by a user, the first focal distance 34 and the second focal distance 36 are determined such that they extend opposite one another starting from the assumed focused distance 32 in each case in the separation 59'. In the illustrated exemplary embodiment, the first focal distance 34 is further away from the workpiece than the second focal distance 36. Of course, this can also be selected to be the other way around. The distance 22 is now, in the determination step, set to the first focal distance 34 by the control device 26, and a first image recording is taken, the intensity of which is evaluated and stored by the data processing unit 28. Accordingly, the distance 22 is then set to the second focal distance 36, and a corresponding intensity at this distance is ascertained.

An intensity Gauss curve 54 that is to be expected is subsequently matched by the data processing unit 28 to the two intensity values for the focal distance 34 and the focal distance 36 by way of interpolation. This intensity Gauss curve 54 that is to be expected is plotted in FIG. 3A for large intensity values to the right over the distance 22 in the z-direction. That means that the intensity value 52 is obtained for example for a determined distance 22. This determined distance 22 is drawn in FIG. 3A by way of a dashed horizontal line. On the basis of the matched intensity Gauss curve 54, the data processing unit 28 can ascertain the extreme value 56 of the curve and the associated most probable location 58 of the best focus.

As an alternative to matching an intensity Gauss curve, it may be advisable to determine the most probable location 58 of the best focus merely from the intensity ratio of the two image recordings with respect to the distance 59. With this linear approach, the most probable location 58 of the best focus is determined by the distance 59 being divided according to the intensity ratio of the two image recordings. For example, if the intensity of one image gives the value 2, and the intensity of the other image gives for example the value 5, then the distance 59 is divided into 2+5=7 units. This then gives the centroid and thus the most probable location 58 of the best focus at 2/7th of the distance 59 from the image with the intensity value 5. In the determination step 102, the most probable location 58 of the best focus can thus be determined from an assessment of the intensities of the two recorded image recordings in relation to the first set focal distance 34 and to the second set focal distance 36 by way of matching an intensity Gauss curve and by way of a linear weighting of the intensity values.

Figure 3B:
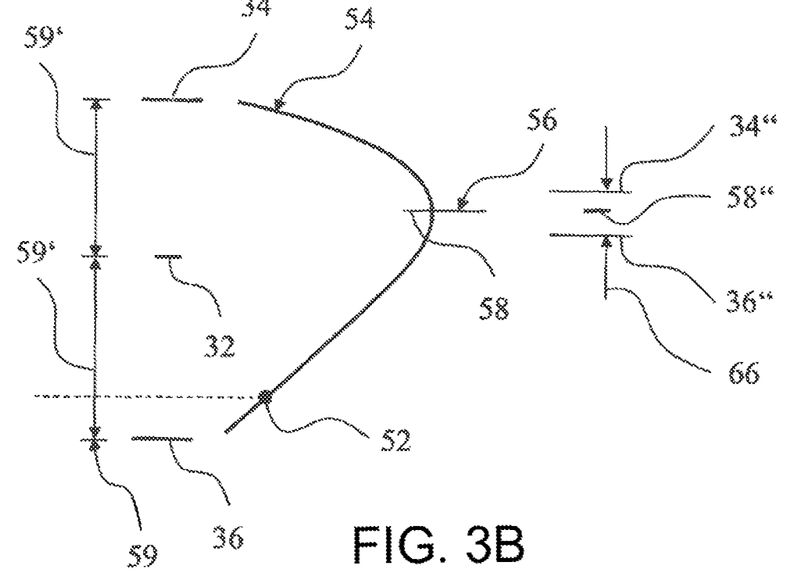
FIG. 3B shows a schematic view for explaining the approximation step.

The left part of the illustration in FIG. 3B shows a copy of FIG. 3A for illustrating the determination step, and the right part shows, for a size comparison, the second difference distance $DA_b$, with the reference sign 66 of the approximation step. What can be clearly seen is that the second difference distance $DA_b$, of the approximation step with the reference sign 66 is smaller than the first difference distance $DA_a$ of the determination step with the reference sign 59. This is because the most probable location of the best focus 58 is known from the determination step, and therefore the search interval 66 can be selected to be correspondingly small for the approximation step. In the approximation step, at least three focal distances 34", 36" and 58" are set, in which the image recordings are evaluated by the data processing unit 28 with respect to the intensity. The focal distances 34" and 36" are correspondingly selected in each case at the end of the search interval 66, as a result of which the largest possible difference distance between the at least three focal distances of the approximation step are given as the second difference distance $DA_b$ by the size of the search interval 66. The third focal distance 58" is then selected such that it corresponds to the focal distance 58 of the most probable location of the best focus from the determination step. An intensity Gauss curve is in turn interpolated by the data processing unit 28 on the basis of the three ascertained intensity values, and the location of the best focus is then obtained approximately from the ascertained extremum of the curve.

In one exemplary embodiment of the method, the exact location of the best focus is then ascertained based on the image recordings for a plurality of different focal distances within the depth of field region 47 in a contrast evaluation step using known contrast criteria, such as for example the criterion of the grey level gradient, which was mentioned initially with respect to FIG. 2B. The initial information relating to the most probable location of the best focus and/or the approximately determined location of the best focus are here helpful for limiting the interval of focal distances that is to be searched. The number of focal distances for the various image recordings can likewise be reduced. Both ultimately result in the time taken for ascertaining the exact location of the best focus being reduced with respect to conventional methods with a contrast evaluation step.

Figure 4:
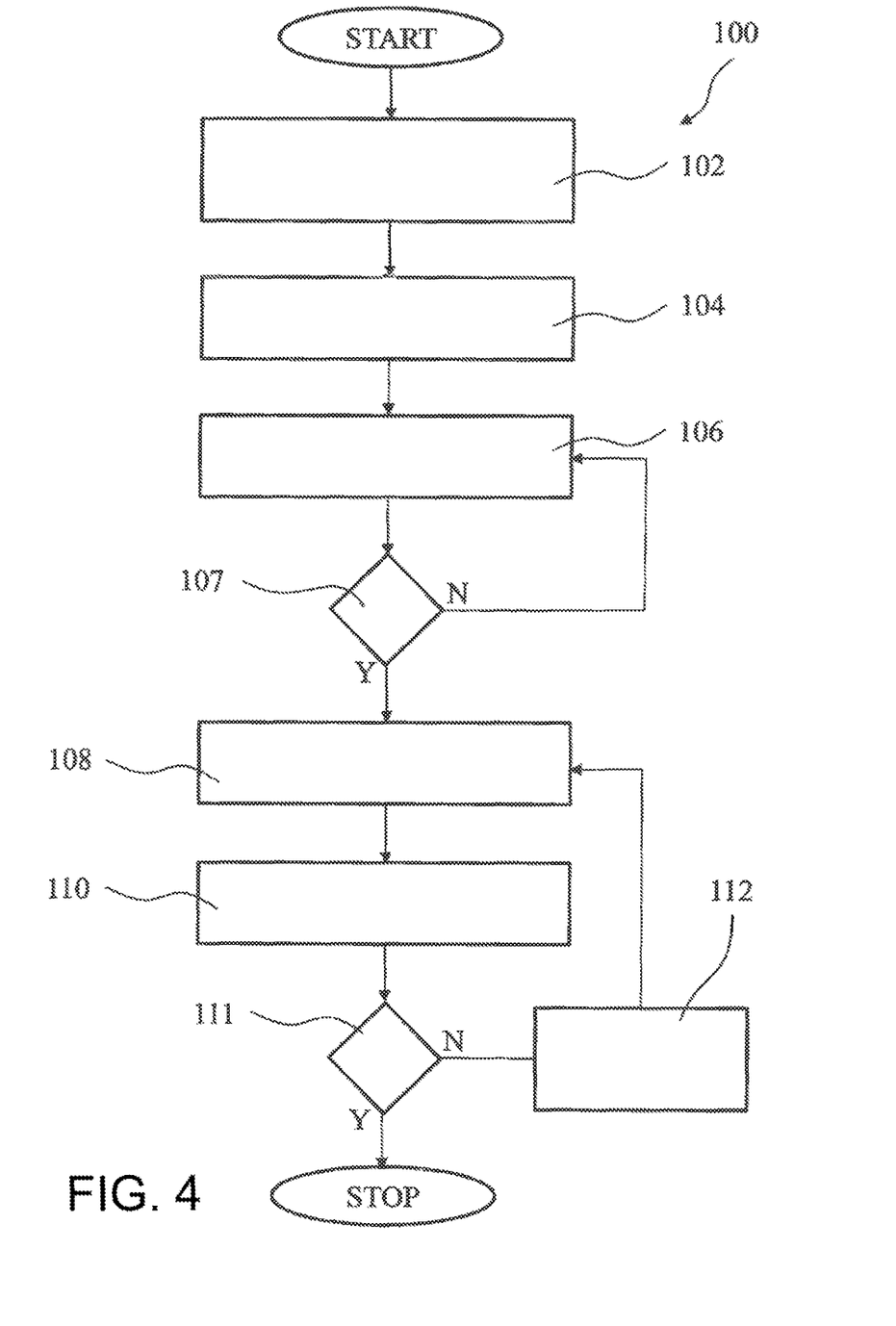
FIG. 4 shows an exemplary embodiment of a method.

FIG. 4 shows a schematic flowchart of a method 100 according to an exemplary embodiment. Once the measurement is started by a corresponding input by the user at the input device 30, the data processing unit 28 and the control device 26 carry out the determination step 102 with the aid of the coordinate-measuring machine 10. For performing the determination step, initially a starting value can be set or input for the focal distance 32 that is to be expected. To this end, various possibilities are conceivable, such as for example the user initially setting the coordinate-measuring machine manually to the focal distance 32 that is to be expected before the determination step starts, or the user inputting at the input device 30 the focal distance 32 that is to be expected at the beginning of the determination step, or the data processing unit 28 itself suggesting such a focal distance 32 that is to be expected, for example on the basis of known measurements taken in the past. Starting from this focal distance 32 that is to be expected, a first focal distance 34 and a second focal distance 36 are selected by the data processing unit 28. This choice is made here such that the resulting first difference distance $DA_a$ between the two focal distances having the reference sign 59 is a multiple of the depth of field DOF in accordance with $DA_a=a*DOF$, with a factor a being in a range of 1<a<5, preferably in a range of 2<a<4, with further preference being 3. This factor a can be given or suggested in advance by the data processing unit 28 or be input by the user. Subsequently, image recordings are taken with the coordinate-measuring machine 10 that is set to these two focal distances, and said recordings are evaluated with respect to their respective overall intensity over all pixels. An intensity Gauss curve is adapted to the intensity values thus obtained as a function of the distance 22 by the data processing unit 28.

Subsequently, the data processing unit 28 ascertains the extremum 56 of the intensity Gauss curve. The location of the extremum 56 then corresponds to the probable location 58 of the best focus.

In the approximation step 104, starting from the most probable location 58 of the best focus, at least three different focal distances 34", 36" and 58" are set by the coordinate-measuring machine 10. Here, the focal distance 58" corresponds to the most probable location 58 of the best focus. In all three set focal distances 34", 36" and 58", image recordings are taken and evaluated by the data processing unit 28 with respect to the overall intensity. In turn, an intensity Gauss curve is adapted to the thus obtained intensity values, and their extremum is ascertained. The location of the best focus is then approximately obtained from the location of the extremum. The difference distance $DA_b$, or the search interval 66 is obtained in the approximation step as a function of the depth of field DOF in accordance with $DA_b=b*DOF$, with $DA_b$, being the largest possible difference distance between the at least three focal distances 34", 36" and 58", and b being a factor in a range of 0.25<b<2, preferably in a range of 0.25<b<1.25, with further preference being 1. This factor b can be given or suggested in advance by the data processing unit 28 or be input by the user.

In the contrast evaluation step 106, starting from the approximately determined location of the best focus, what are known as focus zones are travelled by the coordinate-measuring machine 10, and the image recordings which are obtained in the process are analysed by the data processing unit 28 with respect to a contrast criterion, for example the grey level gradient mentioned in the beginning. However, unlike the case in the determination step, the largest possible difference distance of the focus zone is limited to the depth of field region 47 or a fraction thereof, since sufficiently sharp images for the application of a contrast criterion can be obtained only within the depth of field region 47. This has already been explained in more detail in connection with FIG. 2C. It is then possible, based on a typical contrast criterion, to ascertain the exact location of the best focus with relatively good precision in the contrast evaluation step 106, since such contrast criteria are evaluable only directly around the location of the best focus and thus represent a very sensitive instrument for finding the best focus.

However, it might be the case that either the selected distances between the individual recordings of the focus zone are not optimal, or that the analysed contrast values exhibit such large variations that a desired sufficient precision in the determination of the location of the best focus is not achieved.

Consequently, the error level is determined in the determination of the location of the best focus in a check step 107. If this error level falls below a determined threshold value, the determination of the location of the best focus is deemed to be good (Y), and the method is continued in step 108. However, if the error level is exceeded (N), the contrast evaluation step 106 is repeated.

In step 108, the ascertained exact location of the best focus is set for a subsequent measurement of the surface to be measured, and the user is given the choice between different illumination types and illumination forms of the surface to be measured. Alternatively, the illumination types and illumination forms to be selected in step 108 can also be specified by the data processing unit 28. For example, these illumination types and illumination forms can be stored in an examination plan or a measurement protocol.

After the illumination is set in step 108, the actual measurement of the surface of the workpiece 12 to be measured is performed in step 110. The geometric shapes registered in the recording by the data processing unit 28 are here made available, after a request by the user at the input device, for example on a screen for further evaluation.

However, it may also be the case that the user is not satisfied with the quality of the recording. The quality of the measurement recording is therefore checked by the user himself in step 111 and is either deemed to be good (Y), as a result of which the measurement operation is terminated (STOP), or the quality of the measurement recording is deemed to be insufficient (N), and in this case the recording conditions are changed by the user in step 112, and the method returns to step 108.

If a sufficiently accurate location of the best focus is available even before the start of the method 100, it is also possible—as already mentioned in the beginning—to omit the determination step 102 or the approximation step 104, with the result that only one of the two intensity evaluation steps is used in this method 100 according to an exemplary embodiment of the invention.

Likewise, an illumination system may be provided on the coordinate-measuring machine 10 that is not illustrated in FIG. 1 and makes shared use of at least parts of the lens 44, which is necessary for the imaging on the sensor 14, for realizing a bright-field incident light illumination. It is hereby possible, at least for one wavelength of the illumination light, for the focus of the illumination light on the path from the light source to the surface of the workpiece 12 to be measured to be located in the same plane as the best focus of the lens 44 for the imaging on the sensor 14. With such a measure, it is possible to excessively raise the intensity Gauss curve, and consequently to simplify the determination of the probable location 58 of the best focus in the determination step and the approximate determination of the location of the best focus in the approximation step.

It is understood that the foregoing description is that of the exemplary embodiments of the invention and that various changes and modifications may be made thereto without departing from the spirit and scope of the invention as defined in the appended claims.

What is claimed is:

1. A method for ascertaining a focus image distance of an optical sensor of a coordinate-measuring apparatus with respect to a surface of a workpiece to be measured, the optical sensor being provided with a lens, at least one of the sensor and the workpiece being movable in a Z direction such that a distance in the Z direction between the workpiece and the optical sensor is variable, the method comprising a determination step and an approximation step;

the determination step including:
setting a first focal distance and a second focal distance;
recording a first image of a surface of the workpiece with the optical sensor;
assessing an intensity of the recorded first image of the surface of the workpiece at the first focal distance;
recording a second image of the surface of the workpiece with the optical sensor;
assessing the intensity of the second image of the surface of the workpiece at the second focal distance to determine therefrom a most probable location of a best focus in relation to the first focal distance and to the second focal distance; and the approximation step including:
setting at least three different focal distances in a proximity of the most probable location of the best focus; and,
approximately determining a location of the best focus based on the intensities of the recorded images.

2. The method of claim 1, further comprising a contrast evaluation step, the contrast evaluation step including:
determining the location of the best focus based on contrast criteria.

3. The method of claim 2, comprising the determination step, the approximation step and the contrast evaluation step.

4. The method of claim 3, wherein the approximation step is performed after the determination step.

5. The method of claim 3, wherein the contrast evaluation step is performed after the approximation step.

6. The method of claim 1, further comprising selecting a first difference distance between the first focal distance and the second focal distance in the determination step in accordance with $$DA_a = a * DOF,$$

with $DA_a$ being the difference distance, a being a factor, and DOF being a depth of field of the lens.

7. The method of claim 6, wherein the factor a is in a range of $1 < a < 5$.

8. The method of claim 6, wherein the factor a is in a range of $2 < a < 4$.

9. The method of claim 6, wherein the factor a is 3.

10. The method of claim 1, further comprising selecting a second difference distance between the at least three focal distances in the approximation step in accordance with $$DA_b = b * DOF,$$

with $DA_b$ being the largest possible difference distance between the at least three focal distances, b being a factor, and DOF being a depth of field of the lens.

11. The method of claim 10, wherein the factor b is in a range of 0.25<b<2.

12. The method of claim 10, wherein the factor b is in a range of 0.25<b<1.25.

13. The method of claim 10, wherein the factor b is 1.

14. The method of claim 1, wherein:
the lens is a zoom lens, and
the zoom lens is telecentric on both sides.

15. The method of claim 6, wherein the depth of field of the lens is determined pursuant to $$DOF = \frac{\lambda}{(NA \cdot V)^2}$$

wherein DOF is the depth of field of the lens, V is the magnification of the lens, in particular an axial magnification, NA is the image-side numerical aperture at the magnification, and $\lambda$ is a reference wavelength.

16. The method of claim 15, wherein the reference wavelength is in a range of 400 nm≤$\lambda$≤650 nm.

17. The method of claim 16, wherein the reference wavelength is 550 nm.

18. A coordinate-measuring apparatus comprising:
an optical sensor; and
a control device configured for focusing the optical sensor, wherein the control device is configured for carrying out the method of claim 1.

19. The coordinate-measuring apparatus of claim 18, further comprising:
an illumination system for generating a bright-field incident light illumination; and,
wherein at least parts of the lens are configured to be a part of the illumination system for subjecting the surface to be measured to illumination light.

20. The coordinate-measuring apparatus of claim 19, wherein:
the illumination system emits light with wavelengths $\lambda$ in a range of 400 nm≤$\lambda$≤650 nm, and
for at least one wavelength $\lambda$ in said range for the illumination system for generating the bright-field incident light illumination on the surface to be measured, the lens has a same location of the best focus as for the imaging of the surface to be measured on the sensor.

21. A non-transitory computer readable storage medium containing a computer program which has a program code for carrying out the method of claim 1, if the computer program is executed on a coordinate-measuring apparatus.

* * * * *